United States Patent
Chia et al.

(10) Patent No.: US 7,653,445 B2
(45) Date of Patent: Jan. 26, 2010

(54) APPARATUS AND METHOD FOR MODEL-BASED CONTROL

(75) Inventors: Tien-Li Chia, Mayfield Village, OH (US); Irving Lefkowitz, Charlottesville, VA (US); Coleman B. Brosilow, Rehovot (IL); Alireza Haji-Valizadeh, Twinsburg, OH (US); Shahid Parvez, Willoughby Hills, OH (US); John T. Nagle, Willowick, OH (US)

(73) Assignee: ControlSoft, Inc., Highland Heights, OH (US)

( * ) Notice: Subject to any disclaimer, the term of this patent is extended or adjusted under 35 U.S.C. 154(b) by 480 days.

(21) Appl. No.: 11/734,980

(22) Filed: Apr. 13, 2007

(65) Prior Publication Data

US 2008/0255814 A1    Oct. 16, 2008

(51) Int. Cl.
*G05B 13/02*  (2006.01)
*G05B 11/01*  (2006.01)

(52) U.S. Cl. .............. 700/28; 700/29; 700/31; 700/44; 700/45; 700/72

(58) Field of Classification Search ............. 700/28, 700/29, 31, 44, 45, 72
See application file for complete search history.

(56) References Cited

U.S. PATENT DOCUMENTS

| | | | | |
|---|---|---|---|---|
| 5,191,521 A | | 3/1993 | Brosilow | |
| 5,335,164 A | * | 8/1994 | Gough et al. | 700/29 |
| 5,477,449 A | * | 12/1995 | Iino | 700/29 |
| 5,519,605 A | * | 5/1996 | Cawlfield | 700/31 |
| 5,568,378 A | * | 10/1996 | Wojsznis | 700/44 |
| 6,047,221 A | * | 4/2000 | Piche et al. | 700/44 |
| 7,113,834 B2 | * | 9/2006 | Wojsznis et al. | 700/33 |
| 7,149,590 B2 | * | 12/2006 | Martin et al. | 700/44 |
| 7,486,998 B2 | * | 2/2009 | Ogunnaike et al. | 700/28 |
| 2005/0149208 A1 | * | 7/2005 | Harmse et al. | 700/29 |
| 2007/0078529 A1 | * | 4/2007 | Thiele et al. | 700/29 |
| 2007/0112445 A1 | * | 5/2007 | Vu | 700/44 |

OTHER PUBLICATIONS

ControlSoft, Inc., "MANTRA Advanced Process Control System Function Block Reference Manual Version 2", chapter 2, p. 37, 2001.
R. Berber et al., "Algorithmic Internal Model Control of Unstable Systems," Presented at MZD99 Conference in Haifa, Israel, Jun. 28-30, 1999.

* cited by examiner

*Primary Examiner*—Ronald D Hartman, Jr
(74) *Attorney, Agent, or Firm*—Renner, Otto, Boisselle & Sklar, LLP

(57) ABSTRACT

Various methods and systems for the parametric control of a process include representing the process with a process model used to generate future predictions of a process variable. In one embodiment, the process exhibits integrating behavior that is represented by a non-integrating process model. In another embodiment, an inverse of the model is filtered using a filter that includes a lead time constant that is selected to minimize a steady state error of the predicted process variable. In yet another embodiment, an array of output model values is revised or reindexed in response to a change in a time-varying parameter related to the process.

15 Claims, 4 Drawing Sheets

United States Patent US 7,653,445 B2

APPARATUS AND METHOD FOR MODEL-BASED CONTROL

TECHNICAL FIELD

The present invention generally relates to parametric model-based control of a process, and certain aspects of the present invention have application to the control of an integrating process.

BACKGROUND

In parametric internal model-based control (IMC), a controller may be used to control a process where the controller includes a model of the process. The accuracy of the model drives the performance of the controller. IMC is also known in the art as model predictive control (MPC) or simply as model-based control (MBC). For purposes of this disclosure, the term IMC will be used.

FIG. 1 shows a representation of a control system 10 that includes a model 12 of an integrating process 14 that may be controlled with a controller 16 by a predictive control technique that is represented by an inverted version of the model 12 (realizable model inverse) and an associated filter. Parameters of the model are used to calculate, or predict, a future process variable (PV), and generate a control output (CO) responsive to a given set point. But, as will be explained in greater detail below, modeling the behavior of an integrating process that may have one or more poles at origin leads to computational difficulties.

For any non-zero disturbance (e.g., input disturbance $d_1$ and/or output disturbance $d_2$), the predicted process variable (also known as a controlled variable or CV) will grow without bound due to the integrating nature of the conventional implementation of the model 12 and associated inverted model. The same holds for any non-zero control output CO (also known as a manipulated variable) as the model prediction of the future state of PV also will grow without a bound.

The model output under the forgoing conditions is represented in the graphs of FIGS. 2a and 2b, which share the same scale for the time axis. In FIG. 2a, the control output CO is graphed. As illustrated, a step change to the control output CO is made at a given time. As will be appreciated, the control output CO change is the input value to the process model 12 and the process 14. The predicted process variable that is output by the model 12 is graphed in FIG. 2b.

A dead time D is a measurement of how long the process takes to start to respond to the CO change and may be defined by the amount of time that elapses from the change in control point to when the predicted process variable exceeds a noise threshold defined by a noise band. A time constant (or lag time) may be used as an indicator of how long the process takes to reach steady state after the dead time. For an integrating process, the time constant value may be the amount of time that elapses from the end of the dead time to when the slope of the predicted process variable achieves 63% of the slope of the steady state PV. 95% of the slope of the steady state PV may be achieved after three time constants.

As illustrated, using an integrating process model, the value for the predicted process variable will grow without bound. A maximum slope of the predicted process variable curve (or PV maximum slope) may be determined and the gain (k) may be defined by the PV maximum slope divided by the CO change. The unbounded increase in predicted process variable is not necessarily a design issue for the control system 10, but represents a computational and numerical issue.

Three common solutions exist, but each have drawbacks. The first solution is to convert output disturbances (or modeling errors) to an equivalent input disturbance, such that disturbances and errors that are input to the model are mathematically zeroed in the steady state. The second solution is to reinitialize the state of the predicted process variable from time to time to reduce the occurrence of a numerical overflow. The third solution is to use an internally stable algorithmic internal model control (AIMC) of a two degree of freedom IMC.

While these solutions improve the behavior of the model, they all introduce design and computational complexities. Moreover, for an integrating process, the design of an internal model-based controller is complicated by the introduction of a higher order filter as will be demonstrated below.

With continued reference to FIG. 1, conventional representations of a first order integrating process will now be described. Under these representations, the integrating process 14 may be represented by equation 1A and the model 12 of the process may be represented by equation 2.

$$G_p(s) = \frac{k}{s} e^{-Ds} \qquad \text{Eq. 1A}$$

$$G_m(s) = \frac{\hat{k}}{s} e^{-\hat{D}s} \qquad \text{Eq. 2}$$

The steady state process gain is represented by k in equation 1A and an estimated steady state process gain is represented by $\hat{k}$ in equation 2. Similarly, D is the process dead time and $\hat{D}$ is an estimated dead time. In each equation, a Laplace variable is represented by S.

The controller 16 may be represented by equation 3, in which $G_{m+}^{-1}$ is an invertible portion of the model 12 (equation 2) and F(s) is a filter that is designed to make the controller represented by $G_c(s)$ realizable. The filter specifies a desired response for the process variable PV (referred to as a desired trajectory of PV).

$$G_c(s) = G_{m+}^{-1} \cdot F(s) \qquad \text{Eq. 3}$$

A controller computation round-off error is shown in FIG. 1 as $d_3$, which represents a rounding error. While the rounding error may be very small, the rounding error may still lead to a numerical instability issue, as described below.

The system 10 of FIG. 1 may be simplified into the forms illustrated in FIGS. 3 and 4. If, in FIG. 3, a perfect model 12 is obtained for a first order process 14, $G_m(s)$ will equal $G_p(s)$, and then both $G_m(s)$ and $G_p(s)$ may be represented by equation 1A. If a first order filter F(s) equaling $1/(\epsilon s+1)$ is used, equation 3A results, where $\epsilon$ is a filter time constant.

$$G_c = G_{m+}^{-1} \cdot F(s) = \frac{s}{k(\epsilon s + 1)} \qquad \text{Eq. 3A}$$

As indicated, $G_{m+}$ is the invertible portion of the model and is equal to k/s. In FIG. 4, $G_{IMC}$ may be considered the combination of $G_c$ and $G_m$ and represents an internal model-based controller 16'. $G_{IMC}$ may be expressed as equation 4.

$$G_{IMC} = \frac{G_c}{1 - G_c G_m} = \frac{\frac{s}{k(\varepsilon s + 1)}}{1 - \frac{e^{-DS}}{\varepsilon s + 1}} = \frac{s}{k(\varepsilon s + 1 - e^{-DS})} \quad \text{Eq. 4}$$

In equation 5A, the process variable PV is expressed using a three term equation that represents a dynamic relationship among the value at the input to the controller 16' (first term where SP is the set point), the value at the input to the process 14 following introduction of an input disturbance $d_1$ (second term) and the value at the output of the process following introduction of an output disturbance(s) $d_2$ (third term).

$$PV(s) = \frac{G_{IMC} G_p}{1 + G_{IMC} G_p} SP + \frac{G_p}{1 + G_{IMC} G_p} d_1 + \frac{1}{1 + G_{IMC} G_p} d_2 \quad \text{Eq. 5A}$$

The second term of equation 5A corresponds to an input disturbance to the process 14 and it is desirable for this term to be zero at steady state. If the second term is not zero, a steady state error occurs. By applying a step input for the set point (or set point change) an analysis of how PV will behave may be made. One may represent the step input as r, such that SP(s) equals (1/s)r and equation 6 follows from equation 5A.

$$\lim_{t \to \infty} PV(t) = \lim_{s \to 0} \frac{G_{IMC} G_p}{1 + G_{IMC} G_p} r \quad \text{Eq. 6}$$

$$= \lim_{s \to 0} \frac{\frac{e^{-DS}}{(\varepsilon s + 1 - e^{-DS})}}{1 + \frac{e^{-DS}}{(\varepsilon s + 1 - e^{-DS})}} r$$

$$= \lim_{s \to 0} \frac{e^{-DS}}{\varepsilon s + 1 - e^{-DS} + e^{-DS}} r = r$$

It may be observed that for a change in the set point SP variable, there is a direct correlation in the process variable PV attained at steady state. But if a step input disturbance (e.g., $d_1(s)$ equaling $d_1/s$) is introduced, a steady state error in PV results as indicated by equation 7.

$$\lim_{t \to \infty} PV(t) = \lim_{s \to 0} \frac{G_p}{1 + G_{IMC} G_p} d_1 \quad \text{Eq. 7}$$

$$= \lim_{s \to 0} \frac{\frac{ke^{-DS}}{s}}{1 + \frac{e^{-DS}}{(\varepsilon s + 1 - e^{-DS})}} d_1$$

$$= \lim_{s \to 0} \frac{k(\varepsilon s + 1 - e^{-DS})}{s(\varepsilon s + 1 - e^{-DS} + e^{-DS})} d_1$$

$$= \lim_{s \to 0} \frac{k\varepsilon + kDe^{-DS}}{\varepsilon s + 1 + \varepsilon s} d_1 = (k\varepsilon + kD)d_1 \neq 0$$

It may further be observed that for a step output disturbance where $d_2(s)$ equals $d_2/s$, the third term of equation 5A advantageously goes to zero as demonstrated by equation 8.

$$\lim_{t \to \infty} PV(t) = \lim_{s \to 0} \frac{1}{1 + G_{IMC} G_p} d_2 \quad \text{Eq. 8}$$

$$= \lim_{s \to 0} \frac{\varepsilon s + 1 - e^{-DS}}{\varepsilon s + 1 - e^{-DS} + e^{-DS}} = 0$$

It may be concluded that with a first order filter and a perfect model, the IMC controller 16' (FIG. 4) will have a steady state error for a step input disturbance. To reduce or eliminate the steady state error for a step input disturbance, a complex filter F(s) may be employed. But such a filter is difficult to implement in an actual controller used to control an actual integrating process. In addition, the model that drives the controller still contains a numerical issue in that the value output by the model will grow without bound due to the exponential component of the integrating model.

SUMMARY

According to one embodiment, a method of controlling an integrating process includes representing the integrating process using a non-integrating process model that approximates the behavior of the integrating process; in response to a set point change, predicting a process variable of the integrating process using the non-integrating model as part of a parametric model-based control technique; and generating a control output based on the predicted process variable, the control output for use in controlling the integrating process.

According to another embodiment, a method of controlling an integrating process using a parametric model-based control technique includes representing the process using a process model; applying a filter to an inverse of the process model and predicting a process variable of the process in response to a set point change, the filter represented by:

$$\frac{(\gamma s + 1)^m}{(\varepsilon s + 1)^n}$$

where n is greater than m and m is greater than or equal to zero, $\varepsilon$ is a filter time constant and $\gamma$ is lead time constant of the filter, and $\gamma$ is selected to minimize a steady state error for a step input disturbance to the process by representing $\gamma$ by:

$$\frac{1}{m}(n\varepsilon + \hat{D})$$

where $\hat{D}$ is an estimated dead time of the process; and generating a control output for use in controlling the process.

According to another embodiment, a method of controlling a process using a parametric model-based control technique includes modeling a behavior of the process with a model, the model based on at least one time-varying parameter; establishing a model output array that contains output values of the model for a series of time samples that includes a time sample corresponding to an estimated dead time of the process; revising at least a portion of the model output array that corresponds to time samples occurring after the dead time of the process, the revising based on a change in the time-varying parameter; establishing a disturbance array that contains disturbance values for the process for the series of time samples; revising at least a portion of the disturbance array that corresponds to the revised portion of the model output array, the revising conducted such that, for each revised time sample, a predicted process value determined after the change in time-varying parameter is the same as a predicted process value determined before the change; and generating a bumpless transfer in a control output based on the revised model output array and the revised disturbance array in response to the change in time-varying parameter, the control output for use in controlling the process.

According to yet another embodiment, a method of controlling a process using a parametric model-based control technique includes modeling a behavior of the process with a model, the model based on at least one time-varying parameter; establishing a model output array that contains output values of the model for a series of time samples that includes a time sample corresponding to an estimated dead time of the process; revising at least a portion of the model output array that corresponds to time samples occurring after the dead time of the process, the revising based on a change in the time-varying parameter; and generating a bumped transfer in a control output based on the revised model output array and a disturbance of the process in response to the change in time-varying parameter, the control output for use in controlling the process.

According to still another embodiment, a method of controlling a process using a parametric model-based control technique includes modeling a behavior of the process with a model, the model including an estimate of dead time of the process; establishing a model output array that contains output values of the model for a series of time samples that includes a time sample corresponding to the estimated dead time of the process; in response to a change in the estimated dead time, reindexing the model output array with the changed estimated dead time; and generating a control output based on the reindexed model output array, the control output for use in controlling the process.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto.

Features that are described and/or illustrated with respect to one embodiment may be used in the same way or in a similar way in one or more other embodiments and/or in combination with or instead of the features of the other embodiments.

BRIEF DESCRIPTION OF THE DRAWINGS

FIGS. 2a and 2b respectively are a graph of a step control change and a graph of a corresponding predicted process variable for an integrating process resulting from the control system of FIG. 1;

DISCLOSURE

Figure 1:
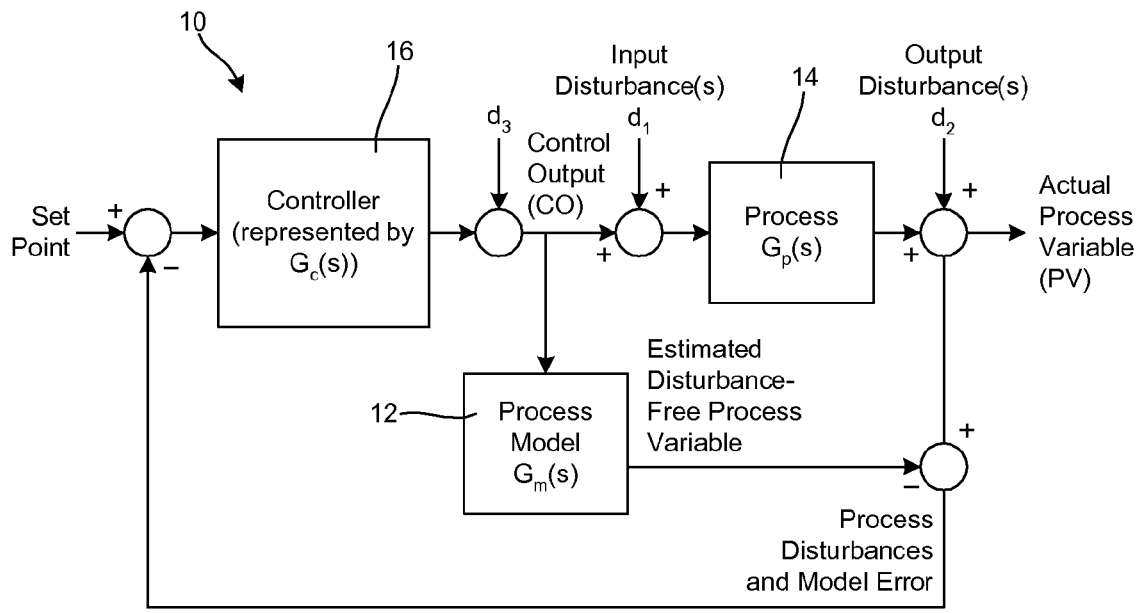
FIG. 1 is a block diagram of a model-based control system used to control an integrating process or a non-integrating process.
Figure 2B:
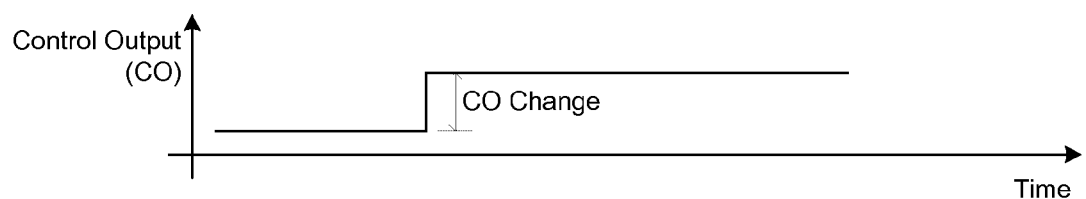
Figure 2B:
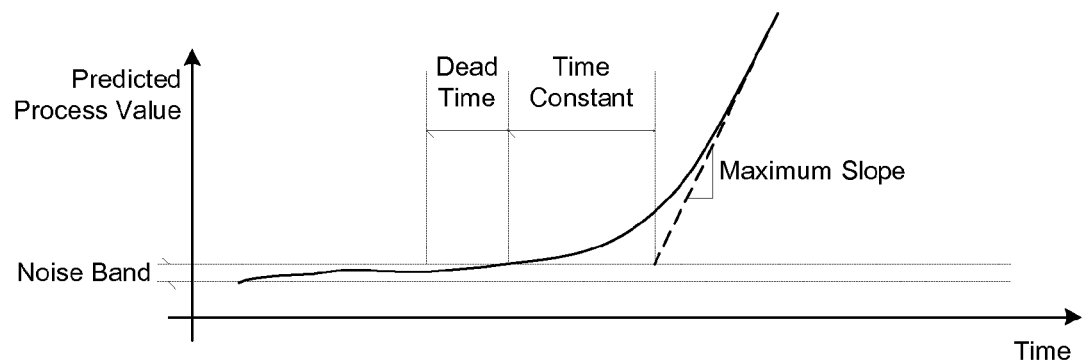
Figure 3:
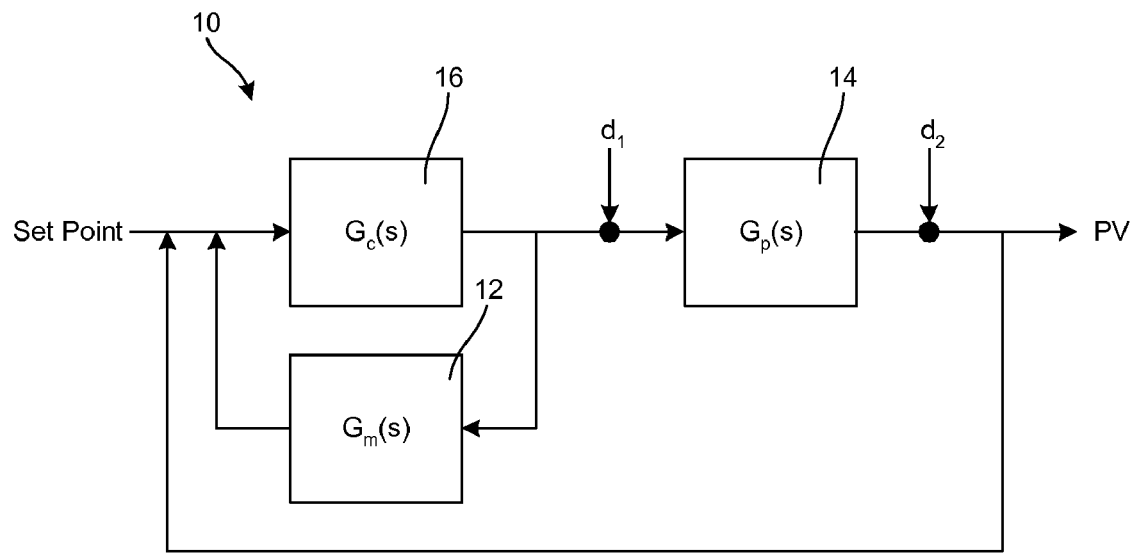
FIGS. 3 and 4 are simplified versions of the model-based control system of FIG. 1.
Figure 4:
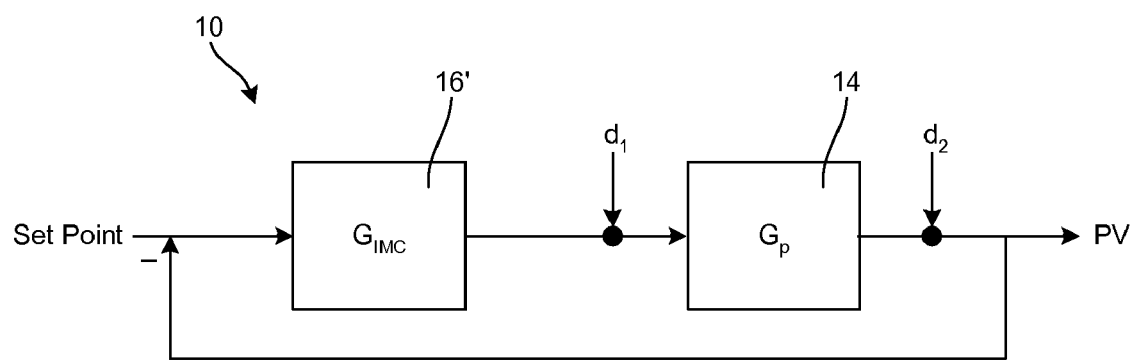

Representative embodiments of the present invention will now be described with reference to the drawings, wherein like reference numerals are used to refer to like elements throughout. It will be understood that the figures are not necessarily to scale.

Control System

Figure 5:
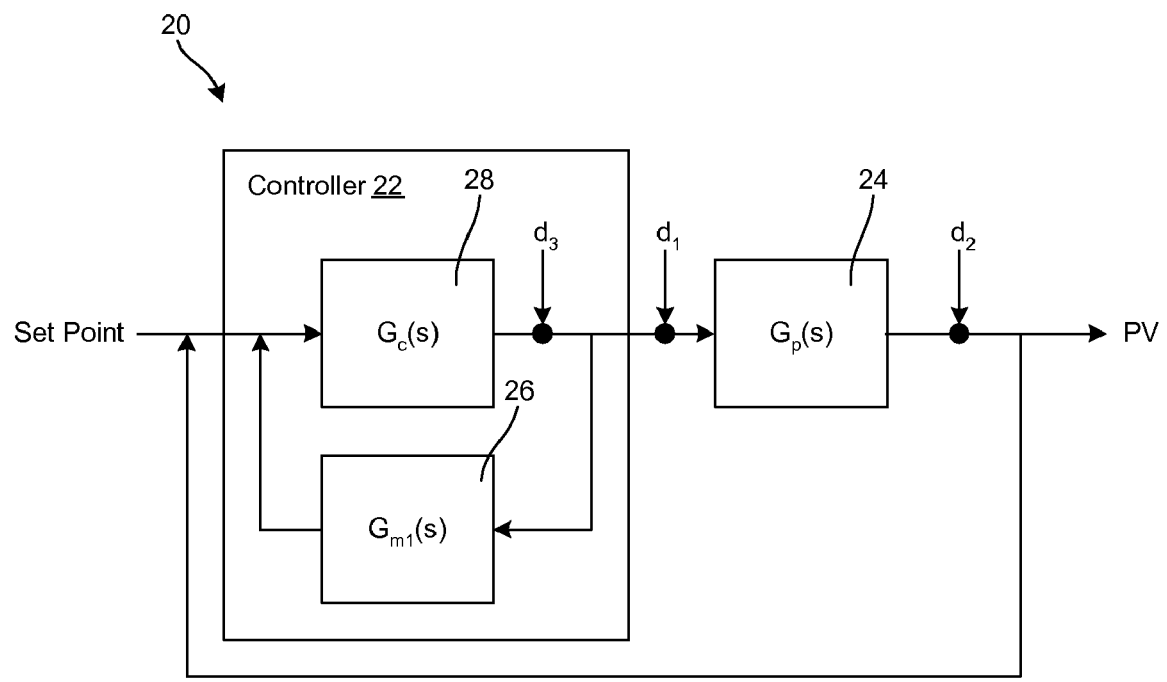
FIG. 5 is a block diagram of a model-based control system used to control an integrating or a non-integrating process.

With reference to FIG. 5, illustrated is a control system 20 that includes a parametric internal model-based control (IMC) controller 22 that controls an integrating process 24. The integrating process 24 may relate to any controllable system, such as a material storage system (e.g., a water tank used for municipal or industrial water storage), a heating or cooling system, a furnace, a heat exchanger, a gas or liquid supply system, a waste water treatment facility, an industrial or manufacturing process, a process exhibiting integrating process behavior, and so forth.

The controller 22 may be implemented with a computing device, such as a system that has a processor for executing logical instructions and a memory for storing such logical instructions in non-volatile memory (e.g., a hard drive, an optical disk (e.g., a CD or DVD) or a flash memory) and/or in system memory (e.g., a random access memory or RAM). The model-based control functions described herein may be implemented in executable code (e.g., software) that is executed by the computing device. In other arrangements, the controller 22 and underlying model-based control functions described herein may be implemented in hardware, firmware or circuitry. Combinations of executable code, firmware and/or circuitry also may be employed. If implemented in executable code, the executable code may be embodied as a machine readable medium (e.g., instructions stored by a memory device).

The controller 22 may include a model 26 (e.g., $G_{m1}(s)$) that is representative of the process 24 and a controller function 28 (e.g., $G_c(s)$) as will be described in greater detail below.

Control of Integrating Process

The following control techniques have application to the design of a controller used for the parametric model-based control of an integrating process, such as a process represented in equations 1A (appearing above), 1B (appearing below) or 1C (appearing below). For example, the controller 22 may be used to control the process 24 where the controller 22 employs a process model cascade used to approximate the integrating process 24.

An exemplary controller design in which the techniques of this disclosure may be included is set forth in U.S. Pat. No. 5,191,521, the disclosure of which is herein incorporated by reference in its entirety. This patent discloses a method of controlling a process that has at least two process variables and a corresponding modular multivariable control apparatus. When applied to the control of a multivariable process, the techniques described herein may be used in the control of one or more of the process variables.

As described in the background section, the conventional model-based control technique for an integrating process is to select a model that is an accurate representation of the process. These models are represented by example in equations 1A and 2.

To avoid the mathematical issue of the output of the model increasing without bound and to reduce the complexity of the controller 22, a different model and/or filter may be used to drive the control of the integrating process 24. In one embodiment, a first order model is used to approximate the gain and integrator (e.g., k/s) of the integrating process 24. An exemplary first order model that may be applied is $\alpha \hat{k}/(\alpha s+1)$ where $\alpha$ is an adjustment factor as will be described in greater detail below and is preferably selected to be a relative large number (e.g., about 100 to about 1,000). The term $\hat{k}$ is an estimate of the steady state gain of the integrating process and may be derived from the steady state slope of a process variable (PV) corresponding to the output of the process 24 (e.g., a level of a storage tank or a level temperature for a thermal process). Applying this exemplary model to the integrating process 24, equation 1A may be rewritten as equation 9A, where $\hat{D}$ is an estimated dead time.

$$G_{m1}(s) = \frac{\alpha \hat{k}}{\alpha s + 1} e^{-\hat{D}s} \qquad \text{Eq. 9A}$$

The model used to approximate the integrating process 24 may be a representation of a non-integrating process where, for a first order system, the ratio of PV(s) to control output (CO(s)) (e.g., PV(s)/CO(s)) equals $(G/(Ts+1))e^{-DS}$ where G is the gain and equals the change in PV divided by the change in CO, T is the time constant, S is a Laplace variable and D is the dead time.

In the approximated model represented by equation 9A, the pole is equal to $-1/\alpha$. Thus, the pole is not at origin (origin being when s equals zero) as is found in equation 2 for the conventional model approach. As the value of $\alpha$ increases or is selected to be sufficiently large, the pole as defined by $-1/\alpha$ will approach zero and, under these circumstances, $G_{m1}(s)$ as expressed by equation 9A is a satisfactory approximation of the perfect model $G_m(s)$. Under the approximation, the initial slope of PV is $\hat{k}$, which corresponds to the steady state gain of the integrating model as set forth in equation 2.

Figure 6:
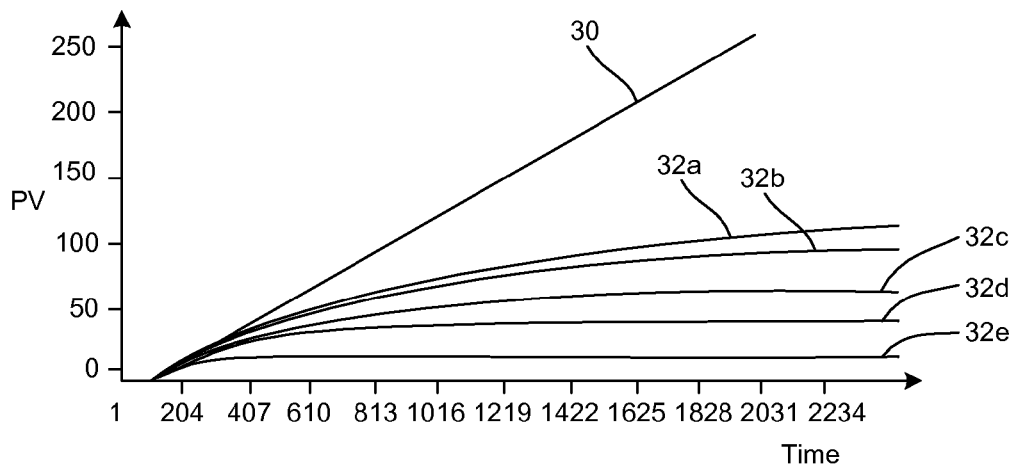
FIG. 6 is an exemplary graph of the steady state gain of a model used by the controller of FIG. 5 for various values of an adjustment parameter.

As an example of the behavior of model $G_{m1}(s)$ versus the behavior of the model $G_m(s)$, reference is made to FIG. 6. In FIG. 6, the steady state gain of the integrating model $G_m(s)$ is represented by curve 30 and curves 32a through 32e represent steady state gains of the model $G_{m1}(s)$ for various values of $\alpha$. In particular, curve 32a corresponds to an $\alpha$ of 1000, curve 32b corresponds to an $\alpha$ of 800, curve 32c corresponds to an $\alpha$ of 500, curve 32d corresponds to an $\alpha$ of 300, and curve 32e corresponds to an $\alpha$ of 100. In FIG. 6, the x-axis represents time and the y-axis represents PV. In the illustrated example, the units of time are in seconds, but could be other units (e.g., milliseconds, minutes or hours) depending on the process. The illustrated PV-axis includes values to provide an indication of scale, but actual units will depend on the process 24. In one example, the process 24 may correspond to a water storage tank such that PV is water level and the units may be in inches, feet or other distance unit.

As will be explained in greater detail below, the approximation of equation 9A is not limited to a first order integrating process. Rather, the approximation approach may be modified for use in controlling a higher order integrating process and/or for controlling a process with multiple-inputs (e.g., multiple input model-based control). In addition, the approximation approach may be used in a modular multivariable control arrangement, such as the process control set forth in above-referenced U.S. Pat. No. 5,191,521.

An implementation of the controller 22 of FIG. 5 may be considered to represent a combination of a process model (e.g., $G_{m1}(s)$) and a realizable model inverse (e.g., $G_c(s)$). The realizable model inverse for the controller 22 may be expressed in accordance with equation 3B.

$$G_c(s) = G_{m1+}^{-1} \cdot F(s) \qquad \text{Eq. 3B}$$

If a second or higher order process model is employed for the integrating process 24, the process 24 may be represented by equation 1B that includes an integrator and a lag $\tau$. Even in this case, a first order approximated model structure for the controller 22 may be used as represented by equation 9B, where the dead time estimate is modified to include an estimated lag $\hat{\tau}$. Using equation 9B, a second or higher order integrating process may be approximated with a first order model that include the adjustment factor $\alpha$ and where a time constant portion of the process in merged into a dead time estimate.

$$G_p(s) = \frac{k}{s(\tau \cdot s + 1)} e^{-Ds} \qquad \text{Eq. 1B}$$

$$G_{m1}(s) = \frac{\alpha \hat{k}}{\alpha s + 1} e^{-\tilde{D}s} \text{ where } \tilde{D} = \hat{D} + \hat{\tau} \qquad \text{Eq. 9B}$$

If a higher order model structure for the controller 22 is desired for use in controlling a higher order integrating process 24, it may be possible to approximate only the integrator portion using the expression of equation 9A, and keep the rest of model structure the same. As indicated, a more detailed description of higher order process models is discussed below.

It may be observed that the initial slope of the approximated models as set forth in equations 9A and 9B are the same as or very similar to the steady state gain of the integrated model as set forth in equations 1A and 1B. As a result, a corresponding transient response of the IMC controller 22 is achieved. For equations 9A and 9B, this result is expressed as equation 10. Similar results for higher order formulation are achieved as expressed in equations 9C and 1C appearing in a subsequent portion of this disclosure.

$$\lim_{s \to \infty} \frac{d}{ds} G_{m1+}(s) = s^2 \frac{\alpha \hat{k}}{\alpha s + 1} \frac{1}{s} = \frac{\alpha \hat{k}}{\alpha} = \hat{k} \qquad \text{Eq. 10}$$

Continuing to consider the case of a first order integrating process (e.g., as expressed by equation 1A), one may select a first order filter, such as F(s) equals $1/(\epsilon S+1)$. In this case, equations 11 and 12 may be derived.

$$G_c = G_{m1+}^{-1} \cdot F(s) = \frac{\alpha s + 1}{\alpha \hat{k}} \frac{1}{\epsilon s + 1} \qquad \text{Eq. 11}$$

$$G_{IMC} = \frac{G_c}{1 - G_c G_{m1}} = \frac{\frac{\alpha s + 1}{\alpha \hat{k}(\epsilon s + 1)}}{1 - \frac{e^{-\hat{D}s}}{\epsilon s + 1}} = \frac{\alpha s + 1}{\alpha \hat{k}(\epsilon s + 1 - e^{-\hat{D}s})} \qquad \text{Eq. 12}$$

One may represent a step input as r, such that SP(s) equals (1/s)r and equation 13A then follows from equation 5A. Equation 13A indicates that if no disturbance is present, the PV may equal the set point.

$$\lim_{t \to \infty} PV(t) = \lim_{s \to 0} \frac{s(G_{IMC}G_p)}{1+G_{IMC}G_p} \cdot \frac{1}{s} \cdot r \qquad \text{Eq. 13A}$$

$$= \lim_{s \to 0} \frac{\frac{\alpha s+1}{\alpha \hat{k}(\varepsilon s+1-e^{-\hat{D}s})} \frac{k}{s} e^{-Ds}}{1+\frac{\alpha s+1}{\alpha \hat{k}(\varepsilon s+1-e^{-\hat{D}s})} \frac{k}{s} e^{-Ds}} \cdot r$$

$$= \lim_{s \to 0} \frac{(\alpha s+1)ke^{-Ds}}{\alpha \hat{k}s(\varepsilon s+1-e^{-\hat{D}s})+(\alpha s+1)ke^{-Ds}} \cdot r = r$$

For a step input disturbance where $d_1(s)$ equals $d_1/s$, equation 13B shows that no steady state error for a step input disturbance may result.

$$\lim_{t \to \infty} PV(t) = \lim_{s \to 0} \frac{G_p}{1+G_{IMC}G_p} d_1 \qquad \text{Eq. 13B}$$

$$= \lim_{s \to 0} \frac{\frac{k}{s}e^{-Ds}}{1+\frac{\alpha s+1}{\alpha \hat{k}(\varepsilon s+1-e^{-\hat{D}s})} \cdot \frac{k}{s} e^{-Ds}} d_1$$

$$= \lim_{s \to 0} \frac{\alpha \hat{k}(\varepsilon s+1-e^{-\hat{D}s}) \cdot ke^{-Ds}}{[\alpha \hat{k}(\varepsilon s+1-e^{-\hat{D}s})s+(\alpha s+1)ke^{-Ds}]} d_1 = 0$$

Similarly, for a step output disturbance where $d_2(s)$ equals $d_2/s$, equation 13C shows that no steady state error for a step output disturbance may result.

$$\lim_{t \to \infty} PV(t) = \lim_{s \to 0} \frac{1}{1+G_{IMC}G_p} d_2 \qquad \text{Eq. 13C}$$

$$= \lim_{s \to 0} \frac{\alpha \hat{k}(\varepsilon s+1-e^{-\hat{D}s}) \cdot s}{\alpha \hat{k}(\varepsilon s+1-e^{-\hat{D}s})s+(\alpha s+1)ke^{-Ds}} d_2 = \frac{0}{k} d_2 = 0$$

As will be appreciated by one of ordinary skill in the art, a filter (e.g., the above-noted filter F(s)) that is relatively simple to implement may be used in conjunction with the approximated model. In addition, the approximated model avoids use of an integrator such that the possibility of values growing without bound are kept to a minimum. As will be described in greater detail below, similar results may be achieved using higher order approximated models in the structure of the controller 22.

With continuing reference to FIG. 5, computational error of the controller 22, if any, may be represented by disturbance $d_3$. The computational error is most often attributed to rounding of numbers and is sometimes referred to as a rounding error. An exemplary term for expressing how the disturbance $d_3$ impacts the calculation of predicted PV is found in equation 14A.

$$PV(s) = \frac{\frac{1}{1-G_C G_m} G_p}{1+G_{IMC}G_p} d_3 \qquad \text{Eq. 14A}$$

Even though computational error of the controller 22 may be very small in value, under an integrating model (e.g., the model of equation 2), it is still theoretically possible that numerical instability may result as the value of the computational error may grow without bound. However, using the approximated model described herein, it may be shown through equation 14B that the disturbance $d_3$ may be translated to PV as a rounding error magnified by $\alpha \hat{k}$ such that the disturbance has minimal or no numerical instability.

$$\lim_{t \to \infty} PV(t) = \lim_{s \to 0} \left( \frac{\frac{1}{1-G_C G_{m1}} G_p}{1+G_{IMC}G_p} d_3 \right) = \alpha \hat{k} \cdot d_3 \qquad \text{Eq. 14B}$$

Tuning

The foregoing model-based control of an integrating process may be implemented in a relatively simple manner. In addition, steady state errors for a step set point change, input disturbances and output disturbances are minimized or eliminated. The model also has a high degree of numerical stability in that it is predicted that the output value of the model will not grow without bound.

To gain the most control over the integrating process 24, it may be desirable to tune the IMC controller 22. One tunable parameter is the filter time constant $\epsilon$. Tuning the filter time constant may be used to adjust the trajectory (e.g., rate of change) of the output value and may be accomplished in any conventional manner.

Another tuning parameter is the selection of the value for $\alpha$, as this value has an impact on the behavior of the control system 20 as demonstrated in connection with FIG. 6 and will be described in greater detail below. The tuning of $\alpha$ will first be described by rearranging equation 13B as equation 15.

$$PV(s) = \frac{\alpha \hat{k}(\varepsilon s+1-e^{-\hat{D}s})e^{-Ds}}{\left[\frac{\hat{k}}{k}\alpha \varepsilon s^2 + \alpha\left(\frac{\hat{k}}{k}+\left(1-\frac{\hat{k}}{k}\right)e^{-\hat{D}s}\right)s+e^{-Ds}\right]} d_1 \qquad \text{Eq. 15}$$

The denominator of equation 15 indicates that the effective time constant is a function of $\alpha$ and, as $\alpha$ increases, the response of PV to the set point change, the input disturbance $d_1$, and the output disturbance $d_2$ will be affected. In one embodiment, the value of $\alpha$ may be selected to be a value of about 100 to about 1,000, but the value of $\alpha$ need not be limited to this range depending on the process 24.

If a larger $\alpha$ is selected, the control output (CO) and the process variable (PV) response is more stable, but the value of PV may tend to overshoot and stay slightly above the set point for a relatively long period of time (e.g., more than three times the selected time constant) before PV converges to the set point.

Figure 7:
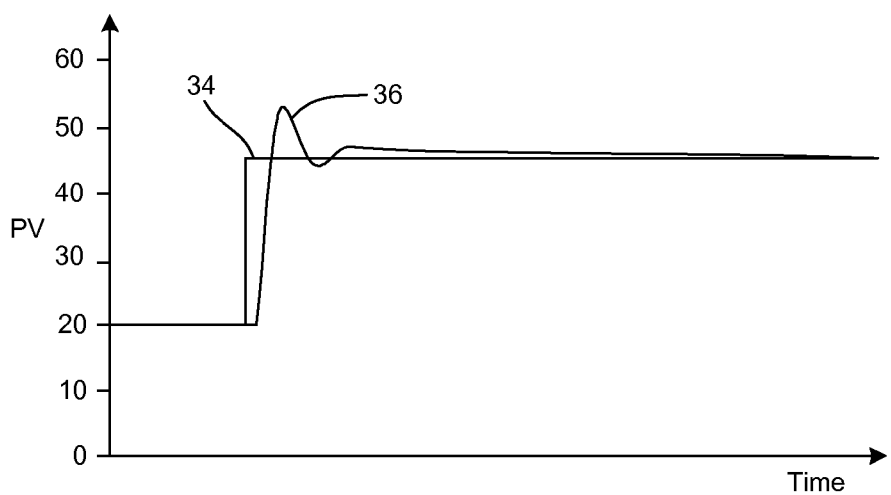
FIGS. 7 and 8 are exemplary graphs of the behavior of the control system of FIG. 5 for respective values of the adjustment parameter.

The behavior of the controller 22 for a relatively large $\alpha$ is graphically illustrated in FIG. 7 where curve 34 represents a step increase in the set point value and curve 36 represents the PV response. In FIG. 7, α is selected to be 1,000. The x-axis in FIG. 7 represents time and the y-axis represents PV. The illustrated PV-axis includes values to provide an indication of scale, but the actual units will depend on the process 24.

If a smaller α is selected, the closed-loop response is generally more oscillatory, but PV may converge to the set point more rapidly.

Figure 8:
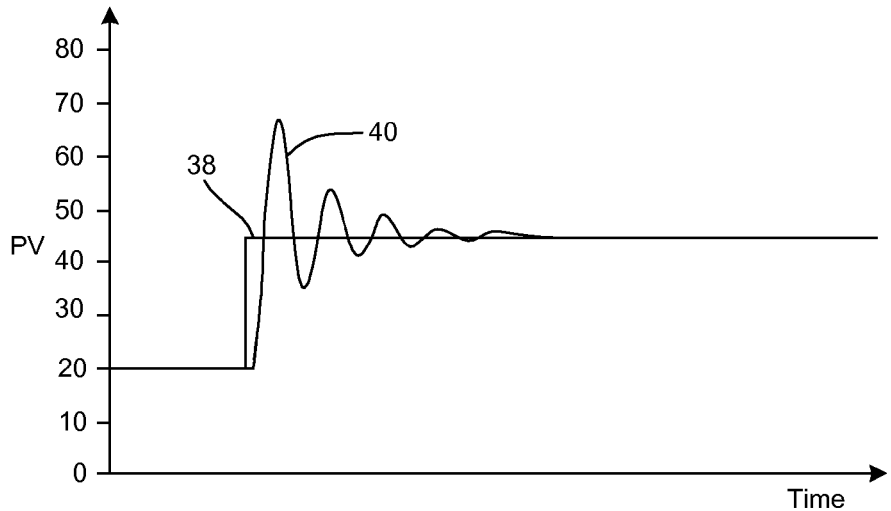

The behavior of the controller 22 for a relatively small α is graphically illustrated in FIG. 8 where curve 38 represents a step increase in the set point value and curve 40 represents the PV response. In FIG. 8, α is selected to be 100. The x-axis in FIG. 8 represents time and the y-axis represents PV. The illustrated PV-axis includes values to provide an indication of scale, but the actual units will depend on the process 24.

As will be appreciated, one may tune the controller 22 by selecting α to correspond to a desired response. Thus, α may be considered to be a tuning or adjustment parameter. For instance, if response stability is of greater interest than set point tracking, a relatively large value for α may be selected. If faster set point tracking is desired, a relatively small α may be selected with recognition of a possibility that the response may have an oscillatory component.

Model-Based Control of a Time-Varying System

Time-varying systems are encountered often in various process control applications. In time-varying systems, the values of model gain k, model lag time constant T and model dead time D from equation 17 (appearing below) may change over time and/or may have an interrelationship as a function of the behavior of the process. For example, in a water supply system or in a wastewater treatment system, the time for water or wastewater to flow from a first point (e.g., point A) to a second point (e.g., point B) may depend on the flow rate. If the flow rate changes, the transportation delay time (or dead time) also changes. For example, if chlorine is injected into a flow of water at point A, there is a time delay until the chlorine is detected by a sensor downstream at point B. The time to sense the change in chlorine level may be based, in part on the water flow rate at the time of adding the chlorine. A similar situation arises in a production and/or packaging line where transportation delay time may change with conveying belt speed changes. The gain of the system may change as well. For instance, the gain of a thermal process may be different at 300° F. than at 500° F.

Parameters of the system also may change as a result of programmed or user-specified changes in model parameters to improve the accuracy of the model and/or to attain a desired behavior of the process. For instance, the selection of α as a tuning parameter may be considered a change in both gain and time constant. As such, it will be understood that a time-varying parameter refers to a parameter that changes no matter the cause (e.g., process-related cause or intervention-based cause). It will be further appreciated that most model-based control systems may be run in a manual mode or an automatic mode. The control over time-varying parameters described herein has application in either mode.

One exemplary approach to dealing with a time-varying system is to use an adaptive control technique such as a self-tuning regulator in which the system dynamics are identified from time to time. But adaptive control has drawbacks since it is slow to adapt to changes and there are contradicting data requirements for model identification and closed-loop control. For instance, model identification under an adaptive control technique involves persistent excitation criteria based on frequent changes or disturbances to the process whereas there is a preference for smooth and stable control outputs for closed-loop control.

Another exemplary approach to dealing with a time-varying system is to apply a gain scheduling technique to the model-based control, similar to gain scheduling of a proportional-integral-derivative (PID) control. This technique involves plural model predictive controls running in parallel where each control has a different model. Depending on the state of the process (e.g., the current k, T and D), one of the controller outputs will be used. This technique involves the feedback of controller output to all controllers, in the same fashion as an override PID control. The gain scheduling of model based control under this technique is complicated to implement.

A different approach to time-varying control is presented in this disclosure section. For the parametric model-based controller 22, the computations for model prediction and controller calculation may be carried out in discrete equations, regardless of the order of the model. Exemplary discrete equations are set forth in equation 16 that represent an auto-regressive moving average model. In equation 16 and ensuing equations, the y(t) terms are an array of model output values and the u(t) terms are an array of controller output values, a is the coefficient of an auto-regressive portion of a polynomial, and b is the coefficient of a moving average portion of a polynomial. The value t is an integer time sample such that y(t) is the model output value at the present time, y(t+1) is the model output value in one time sample and so forth. The value q is the number of time samples corresponding to the point in the array where the dead time falls.

$$y(t)+a_1*y(t-1)+a_2*y(t-2)+ \ldots =b_0*u(t-q)+b_1*u(t-q-1)+\ldots \qquad \text{Eq. 16}$$

Accordingly, for a first order system y(t+1) will equal $a_1 y(t)+b_0 u(t)$ and, for a second order system, y(t+1) will equal $a_1 y(t)+a_2 y(t-1)+b_0 u(t)$. A third term may be added for a third order system and so forth.

There may be different ways of deriving the parameters $a_0$, $a_2, \ldots, b_0, b_1, \ldots$ for an integrating or non-integrating transfer function (e.g., transfer function $G_m(s)$ or $G_{m1}(s)$). For example, for a first order model cascade with a dead time given by equation 17, the computations may be implemented using the discrete equation given by equation 18, where $a_1$, is given by equation 18A, $b_0$ is given by equation 18B and q is given by equation 18C in which Δt is a duration of the sample time t.

$$G(s) = \frac{k}{Ts+1} e^{-Ds} \qquad \text{Eq. 17}$$

$$y(t) = a_1 y(t-1) + b_0 * u(t-q) \qquad \text{Eq. 18}$$

$$a_1 = \frac{T}{T+\Delta t} \qquad \text{Eq. 18A}$$

$$b_0 = \frac{K \cdot \Delta t}{T+\Delta t} \qquad \text{Eq. 18B}$$

$$q = \frac{D}{\Delta t} \qquad \text{Eq. 18C}$$

Thus, in order to predict into the future, equation 19A and 19B may be employed, where n is the number of samples that are predicted into the future (e.g., n is the size of the arrays) and represents the amount of future time that one is interested in controlling (e.g., y(t+n) at a certain desired value or set point). At current time t, the future predicted model output up to the dead time (e.g., y(t+1), ... y(t+q)) may be calculated using past control outputs (e.g., u(t−q+1), ... u(t)) in accordance with equation 19A. Calculation of future predicted model output after the dead time (e.g., y(t+q+1), ... y(t+n)) may be based on future control outputs (e.g., u(t+1), ... u(t+n−q)). But future control outputs may not be known at the present time. Thus, an assumption that the control outputs will remain the same in the relative near future may be made. Under this assumption, the future model outputs after the dead time may be calculated in accordance with equation 19B.

$$y(t+1) = a_1 y(t) + b_0 * u(t-q+1) \quad \text{Eq. 19A}$$
$$\vdots$$
$$y(t+q) = a_1 y(t+q-1) + b_0 * u(t)$$

$$y(t+q+1) = a_1 y(t+q) + b_0 * u(t+1) \quad \text{Eq. 19B}$$
$$\vdots$$
$$y(t+n) = a_1 y(t+n-1) + b_0 * u(t+n-q)$$

where $u(t+1) = u(t+2) = \ldots = u(t+n-q) = u(t)$

In the controller 22 implementation, a dead time array (also referred to herein as a model output array) of n elements may be used for storing model output given by equation 20 in which n is greater than q.

$$y(t+n), y(t+n-1), \ldots y(t+q+1), y(t+q), \ldots y(t+1) \quad \text{Eq. 20}$$

This dead time array may be updated at each sample time and when a new control output is calculated. Since information regarding future disturbances is lacking, a current disturbance d(t) may be used for all future disturbances under the assumption that the disturbance should remain constant or nearly constant over the near future.

Equation 21 provides an array of disturbance values that represents the difference between a measured process variable and a calculated model output at the current time.

$$d(t+n) = d(t+n-1) = \ldots = d(t+1) = d(t), \text{ where } d(t) = PV(t) - y(t) \quad \text{Eq. 21}$$

The predicted process variable in future time may be equal to the sum of the model output y(t+1) and the future disturbance estimate d(t+1), such that the predicted PV at future time i is given by equation 22, where i is a selected number of time samples.

$$PV(t+i) = y(t+i) + d(t) \quad \text{Eq. 22}$$

Then, the control output may be calculated by minimizing a costs function of future errors in accordance with equation 23.

$$\min \sum_{i=1}^{n-q-1} (PV(q+i) - SP)^2 \quad \text{Eq. 23}$$

In some systems, when the model dynamic changes (e.g., change of k, T and/or D), it may not be sufficient to recalculate discrete model parameters $a_1, a_2, b_0, b_1, \ldots$, and/or to reinitialize the dead time array y(t+n), ... y(t+1) and the disturbance estimate d(t). This is because these actions will lose model prediction information from the past, thereby introducing disturbances into the system.

To implement a strategy to account for time-varying changes with the model-based control framework described herein, two arrays, together with the dead time array of equation 20, may be used. The first array is given by equation 24 and is used to store (e.g., buffer) past control output values. The second array is given by equation 25 and is used to store (e.g., buffer) the current disturbance estimate d(t) under an assumption that the disturbance remains constant over the future calculated time period.

$$u(t), u(t-1), \ldots u(t-q+1), u(t-q), \ldots u(t-n), u(t-n+1) \quad \text{Eq. 24}$$

$$d(t+n), d(t+n-1), \ldots d(t+q+1), d(t+q), \ldots d(t+1) \quad \text{Eq. 25}$$

For changes of the model gain (e.g., a change of k to k') and/or the model time constant (e.g., a change of T to T'), one may recalculate the model parameters (e.g., $a_1$ to $a_1'$ and $b_0$ to $b_0'$ and similar for higher order systems). In the case of a first order model according to equation 18, equations 26A and 26B result. Equations 26A and 26B may be used to ascertain parameter values that may be applied in the discrete representation of the parametric model-based control (e.g., equation 16), and represent updated model parameters.

$$a_1' = \frac{T'}{T' + \Delta t} \quad \text{Eq. 26A}$$

$$b_0' = \frac{k' \cdot \Delta t}{T' + \Delta t} \quad \text{Eq. 26B}$$

One of ordinary skill in the art will appreciate that the values of a and b may be represented in other manners, both for equations 18A and 18B and for equations 26A and 26B. As one alternative example, $a_1$ may be expressed as $(T-\Delta t)/T$ and $a_1'$ may be expressed as $(T'-\Delta t)/T'$.

The model output array (equation 20) may be reconstructed to achieve a bumpless transfer or a non-bumpless transfer, as is desired for the process 24. Implementing details of both approaches are described below. In both approaches, the controller 22 may be run in an automated mode (e.g., a change to a manual mode may be avoided). The generation of an updated model output array y(t) and an updated disturbance array d(t) for both approaches are discussed below. The updated arrays may be used to generate appropriate control output values using any suitable model-based control technique. The handling of time-varying parameters, such as gain changes and/or time constant changes, in this manner may be applied in control systems that employ a non-integrating model of first and higher orders and in control systems that employ an integrating model of first and higher orders.

Model-Based Control of a Time-Varying System

Bumpless Transfer

In model-based control of a system, the controller predicts a future process variable using a model of the process, and establishes a control output that is input to the process so that the actual process variable in the future will be at a desired value corresponding to a set point. When a model parameter changes, the control output calculation is affected. But for some processes, one may not want to have an instantaneous change in control output value in response to the change in model parameter. In this situation, a bumpless transfer is typically preferred over a bumped transfer.

For a bumpless transfer, the model output array y(t) may be updated using $a_1'$ and $b_0'$ to generate a revised model output array (e.g., y'(t+n), y'(t+n−1), ... y'(t+q+1), y'(t+q), ... y'(t+1)). That is, the y(t) values may be recalculated by solving for the various y values from equations 19A and 19B while using the new model parameters according to equations 26A and 26B. In the terms of equation 19, the past history of control outputs (e.g., u(t), u(t−1), ... u(t−q+1), u(t−q), ... u(t−n)) are used and the current control output u(t) is used for future control output values (e.g., it is assumed that future control output remains constant). It is noted that some past model output values (e.g., y(t), y(t−1), ... ) may be maintained for use in second or higher order models.

Then, the disturbance array d(t) may be updated to generate a revised disturbance array (e.g., d'(t+n), d'(t+n−1), ... d'(t+q+1), d'(t+q), ... d'(t+1)) such that d'(i)+y'(i) equals y(i)+d(1) is satisfied (e.g., the predicted future process variable remains the same as before the change in model parameters (a and b) over i equals 1 to n.) The predicted future process variable may be the sum of the model output array and the disturbance array (e.g., PV(t+i)=y(t+i)+d(t+i) and PV'(t+i)=y'(t+i)+d'(t+i)).

That is, using the current disturbance value d(1), the sum of the current disturbance value d(1) and the previously predicted model output value y(i) for each time sample and the sum of the revised disturbance value d'(i) and the revised model output value y'(i) for each corresponding time sample will result in the same predicted process value. In other words, the disturbance value is updated for each time sample so that there is no change in predicted process variable from before the revision to the terms a and b to after revision of the terms to a' and b'. As an example, if before the change in model gain k, mode lag time constant T or dead time D, the predicted process value as given by y(i)+d(1) is 110 (e.g., y(i) is 100 and d(1) is 10) and after the change the revised y'(i) is 98, then the revised d'(i) would be 12 so that d'(i)+y'(i) equals y(i)+d(1) is satisfied and the predicted future process variable remains the same as before the change in model parameters (a and b) over i equals 1 to n. Future disturbances may be set as d'(t+n) with no updates of the disturbance for n samples.

In another embodiment, the model output array (e.g., y(i)) and the disturbance array (e.g., d(i)) may be updated in the manner described above to generate a revised model output array y'(i) and a revised disturbance array d'(i) for only the portion of the arrays after the dead time (e.g., revise the arrays for i equals q+1 to i equals n). The rest of both the arrays before the dead time (e.g., y(t+q) ... y(t+1) and d(t+q) ... d(t+1)) may be left unchanged (e.g., the updated model parameters from equations 26A and 26B are not used for the unchanged portions of the arrays). In this embodiment, the future disturbance estimate may be fixed as d'(t+n) for q samples. Calculations to derive the disturbance estimate may resume after time n.

Model-Based Control of a Time-Varying System

Bumped Transfer

For some applications an instantaneous change in control output in response to a change in model parameters may be acceptable. In this case, a bumped transfer may be acceptable.

For a bumped transfer, the model output array y(t) may be updated using $a_1'$ and $b_0'$ to generate a revised model output array (e.g., y'(t+n), y'(t+n−1), ... y'(t+q+1), y'(t+q), ... y'(t+1)). That is, the y(t) values may be recalculated by solving for the various y values from equations 19A and 19B while using the new model parameters according to equations 26A and 26B. In the terms of equation 19, the past history of control outputs (e.g., u(t), u(t−1), ... u(t−q+1), u(t−q), ... u(t−n)) are used and the current control output u(t) is used for future control output values (e.g., it is assumed that future control output remains constant). It is noted that some past model output values (e.g., y(t), y(t−1), ... ) may be maintained for use in second or higher order models.

For the bumpless transfer described above, the entire model output array and the entire disturbance array are updated, or just the portions of both arrays after the dead time are updated. For the bumped transfer the entire model output may be revised but only a portion of the disturbance array is revised as follows. After revision of the model output array, a portion of the disturbance array before the dead time (e.g., d(t+q) ... d(t+1)) is updated such that the predicted future process variable (e.g., sum of the model output array y(t+i) and the disturbance array d(t+i)) remains the same as before the change in model parameters for i equals 1 to q. This is the same revision as found in the bumpless case, but for only a portion of the disturbance array. The portion of the disturbance array after the dead time (e.g., d(t+n) ... d(t+q+1)) is left unrevised. In this manner, the controller output may be adjusted in correspondence to the model change. It is preferred that the disturbance array estimate is kept constant by not calculating PV(t) minus y(t) for each sample time for q samples and then resuming disturbance estimate calculation at time t+q+1.

In another embodiment, a portion of the model output array y(i) is updated only after the dead time (e.g., revise y(t) to y'(t), for i equals q+1 to i equals n) in the above-described manner. The remainder of the model output array before the dead time (e.g., y(t+q) ... y(t+1)) and the entire disturbance array (e.g., d(t+n), ... d(t+q+1), d(t+q), ... d(t+1)) may be left unrevised.

Model-Based Control of a Time-Varying System

Change of Dead Time

For changes in dead time (e.g., transportation delay, thermal response delay, velocity change delay, etc.), one may express the delay as a change from a current dead time D to a future dead time D'. In this case, values of q and p may be respectively expressed in equations 27A and 27B.

$$q = \frac{D}{\Delta t} \qquad \text{Eq. 27A}$$

$$p = \frac{D'}{\Delta t} \qquad \text{Eq. 27B}$$

If the size of the dead time array (model output array) is sufficiently large (e.g., n is greater than q and n is greater than p), then there may be no need to recalculate the dead time array. Rather, the dead time array is merely relabeled (e.g., reindexed) with the new dead time p, instead of the old dead time q as set forth by equation 28.

change:y(t+n),y(t+n−1), ... y(t+q+1),y(t+q), ... y(t+1)

to:y(t+n),y(t+n−1), ... y(t+p+1),y(t+p), ... y(t+1)   Eq. 28

If n is less than p, the array may be extended, using equations 19A and 19B, so that there are at least p samples in the array.

The handling of time-varying model parameters for dead time changes in this manner may be applied to non-integrating models of first and higher orders, integrating models of first and higher orders, and may be implemented when the controller 22 is placed in a manual mode as well as in an automatic mode.

Generalization of Model-Based Control

As indicated above, the approaches to approximating the behavior of an integrating process with a non-integrating model may be applied to first order processes as well as second or higher order processes with selection of an appropriate filter.

With continued reference to FIG. 5, the following outlines the generalization of model-based control of an integrating process where an approximating model of the integrating process is used in the IMC controller 22. Equation 5A may be generalized as represented by equation 5B.

$$PV(s) = H_O(s) \cdot SP(s) + H_1(s) \cdot d_1(s) + H_2(s) \cdot d_2(s) \quad \text{Eq. 5B}$$

where $$H_O(s) = \frac{1}{1 + G_{IMC}^{-1}(s) \cdot G_p^{-1}(s)}$$

$$H_1(s) = \frac{G_p(s)}{1 + G_{IMC}^{-1}(s) \cdot G_p^{-1}(s)} = H_O(s) \cdot G_{IMC}^{-1}(s) \text{ and}$$

$$H_2(s) = \frac{1}{1 + G_{IMC}^{-1}(s) \cdot G_p^{-1}(s)} = H_1(s) \cdot G_p^{-1}(s)$$

Also, equation 1A may be generalized by including the term $G_p^0(s)$ as expressed by equation 1C, where $G_p^0(s)$ represents higher order terms.

$$G_p(s) = \frac{k}{s} G_p^0(s) e^{-DS} \text{ where } s \xrightarrow{\lim} 0 \ G_p^0(s) = 1 \quad \text{Eq. 1C}$$

Using a model of the form similar to the model expressed in equation 9A, a generalized approximation model may be expressed by equation 9C, where $G_{m1}^0(s)$ represents higher order terms of the model.

$$G_{m1}(s) = \frac{\alpha \hat{k}}{\alpha s + 1} G_{m1}^0(s) e^{-\hat{D}s} \text{ where} \quad \text{Eq. 9C}$$

$$s \xrightarrow{\lim} 0 \ G_{m1}^0(s) = 1$$

As will be understood, the model of equation 9C approximates an integrating process when α is relatively large. In the limit of equation 9C, α becomes infinite and $G_{m1}(s)$ from equation 9C reduces to the model structure found for $G_p(s)$ from equation 1C.

Furthermore, the filter may be generalized as found in equation 29, where γ is a lead time constant of the filter.

$$G_C(s) = G_{m1+}^{-1}(s) \cdot F(s) \quad \text{Eq. 29}$$

where $$G_{m1+}(s) = G_{m1}(s) e^{\hat{D}s} \text{ and}$$

$$F(s) = \frac{(\gamma s + 1)^m}{(\varepsilon s + 1)^n} \text{ where } n > m \geq 0.$$

Using equation 4, the invertible portion of the model may be expressed as found in equation 30.

$$G_{IMC}^{-1}(s) = G_c^{-1}(s) \cdot G_m = G_{m1+}(s)[F(s)^{-1} - e^{-DS}] \quad \text{Eq. 30}$$

If the set point SP(s) equals r/s, the PV may be expressed in accordance with equation 31, where $PV_{ss}$ is the steady state value of PV.

$$PV_{ss} = t \xrightarrow{\lim} \infty PV(t) = s \xrightarrow{\lim} 0 \left[ s \cdot H_0(s) \cdot \frac{r}{s} \right] \quad \text{Eq. 31}$$

If $H_0(0)$ is defined as $$H_0(0) = s \xrightarrow{\lim} 0 \ H_0(s),$$

then $PV_{ss} = H_0(0) \cdot r$ and equation 32 results where $\theta_1$ and $\theta_2$ denote a polynomial in "s" such that $$s \xrightarrow{\lim} 0 \ \theta_1(s) = 0 \text{ and } s \xrightarrow{\lim} 0 \ \theta_2(s) = 0.$$

Also, the solution of equation 33 is achieved and $PV_{ss}$ equals r for all values of the indicated parameters.

$$H_0(0) = s \xrightarrow{\lim} 0 \left[ \frac{1}{1 + G_{m1+}(s)[F(s)^{-1} - e^{-DS}] \cdot \frac{se^{DS}}{kG_p^0}} \right] \quad \text{Eq. 32}$$

$$= \frac{1}{1 + s \xrightarrow{\lim} 0 \left[ \frac{\hat{k} \alpha s G_{m1}^0(s) e^{DS}}{k(\alpha s + 1) G_p^0(s)} [1 + (n\varepsilon - m\gamma)s + s\theta_1(s) - (1 - \hat{D}s + s\theta_2(s))] \right]}$$

$$H_0(0) = \frac{1}{s \xrightarrow{\lim} 0 \left[ \frac{\hat{k}}{k} \alpha \left[ (n\varepsilon - m\gamma + \hat{D}) s^2 + s\theta_3(s) \right] + 1 \right]} = 1 \quad \text{Eq. 33}$$

If $D_1(s)$ equals $d_1/s$, then $PV_{ss}$ may be expressed as set forth in equation 34 for a finite value of α and if γ is selected as in equation 35.

$$PV_{ss} = s \xrightarrow{\lim} 0 [H_O(s) \cdot G_{IMC}^{-1}(s)]$$

$$PV_{ss} = d_1 \cdot s \xrightarrow{\lim} 0 \ G_{IMC}^{-1}(s) \quad \text{Eq. 34}$$

$$= s \xrightarrow{\lim} 0 \ \frac{\hat{k} \alpha d_1}{\alpha s + 1} (n\varepsilon - m\gamma + \hat{D}) s = 0$$

$$\gamma = \frac{1}{m}(n\varepsilon + \hat{D}) \quad \text{Eq. 35}$$

In a purely integrating model, α may equal infinity, in which case $PV_{ss}$ equals $\hat{k} d_1(n\varepsilon - m\gamma + \hat{D})$. If γ is selected in accordance with equation 35, $PV_{ss}$ may equal zero.

If $D_2(s)$ equals $d_2/s$, then $PV_{ss}$ may be expressed as set forth in equation 36.

$$PV_{ss} = s \xrightarrow{\lim} 0 \ [H_1(s) \cdot G_p^{-1}(s)] \quad \text{Eq. 36}$$

-continued $$PV_{ss} = s \xrightarrow{\lim} 0 \; \frac{\hat{k}\alpha}{\alpha s + 1}(n\varepsilon - m\gamma + \hat{D})s \cdot \frac{s}{kG_p^0(s)e^{-DS}} = 0$$

In an exemplary implementation, a filter in accordance with equation 37 may be achieved by using the filter of equation 29 and selecting γ in accordance with equation 35, selecting n to equal 1 and selecting m to equal 3.

$$F(s) = \frac{(3\varepsilon + D)s + 1}{(\varepsilon s + 1)^3} \qquad \text{Eq. 37}$$

Using the third order filter of equation 37, $G_c$ may be expressed in the manner set forth in equations 38 and 39, which leads to the expression of $G_{IMC}$ as set forth in equations 40 and 41.

$$G_c = G_{M1+}^{-1}F(s) \text{ where } F(s) = \frac{(3\varepsilon + D)s + 1}{(\varepsilon s + 1)^3} \qquad \text{Eq. 38}$$

$$G_c = \frac{s((3\varepsilon + D)s + 1)}{k(\varepsilon s + 1)^3} \qquad \text{Eq. 39}$$

$$G_{IMC} = \frac{G_c}{1 - G_c G_{m1}} \qquad \text{Eq. 40}$$

$$G_{IMC} = \qquad \text{Eq. 41}$$

$$\frac{\frac{s((3\varepsilon + D)s + 1)}{k(\varepsilon s + 1)^3}}{1 - \frac{((3\varepsilon + D)s + 1)}{(\varepsilon s + 1)^3}e^{-DS}} = \frac{s((3\varepsilon + D)s + 1)}{k((\varepsilon s + 1)^3 - ((3\varepsilon + D)s + 1)e^{-DS})}$$

Focusing on a step input disturbance term, the value of PV may be ascertained through equation 42A.

$$PV = \frac{G_p}{1 + G_{IMC}G_p}d_1 \qquad \text{Eq. 42A}$$

$$= \frac{\frac{k}{s}e^{-DS}}{1 + \frac{s((3\varepsilon + D)s + 1)}{k((\varepsilon s + 1)^3 - ((3\varepsilon + D)s + 1)e^{-DS})} \cdot \frac{k}{s}e^{-DS}}$$

$$= \frac{\{(\varepsilon s + 1)^3 - ((3\varepsilon + D)s + 1)e^{-DS}\}ke^{-DS}}{s\{(\varepsilon s + 1)^3 - ((3\varepsilon + D)s + 1)e^{-DS} + ((3\varepsilon + D)s + 1)e^{-DS}\}}$$

$$= \frac{((\varepsilon s + 1)^3 - ((3\varepsilon + D)s + 1)e^{-DS})ke^{-DS}}{s(\varepsilon s + 1)^3}$$

By differentiating both the numerator and the denominator of equation 42A, the numerator portion of equation 42A may go to a value of zero in steady state as shown in equation 42B and the denominator portion of equation 42A may go to a value of one as shown in equation 42C.

$$\text{numerator} = s\xrightarrow{\lim}0(-D)Ke^{-DS}((\varepsilon s + 1)^3 - ((3\varepsilon + D)s + 1)e^{-DS}) \qquad \text{Eq. 42B}$$
$$+ Ke^{-DS}[3(\varepsilon s + 1)^2\varepsilon - (-D)(((3\varepsilon + D)s + 1)e^{-DS}$$
$$- (3\varepsilon + D)e^{-DS})]$$
$$= -DK(1-1) + K(3\varepsilon + D - (3\varepsilon + D)) = 0$$

$$\text{denominator} = s\xrightarrow{\lim}0 \; \frac{d}{ds}s((\varepsilon s + 1)^3) \qquad \text{Eq. 42C}$$

$$= s\xrightarrow{\lim}0(\varepsilon s + 1)^3 + s(\varepsilon s + 1)^2 \cdot 3\varepsilon = 1$$

The third order filter, therefore, may result in PV equaling the desired set point.

The results of this generalized approach to model-based control may be summarized as follows. The representation of an integrating process using an approximated model may apply to second and higher order processes, in addition to first order processes. Further, the application extends to the case where the pole at the origin is approximated by a first order lag with a time constant that is large relative to a dominant time constant of the process.

For an integrating process as expressed by equation 1C with an approximated model structure as expressed by equation 9C, the steady-state error for a step change in set point may be zero. Similarly, the steady-state error for a step input disturbance $d_1$ may be zero. Also, for an integrating process as expressed by equation 1C and a model of $G_m(s)$ (e.g., equation 2) that has a pole at the origin or when α is infinite as in equation 9C, then the steady-state error may equal $\hat{k}(n\varepsilon - m\gamma + \hat{D})d_1$. For a filter F(s) as expressed in equation 29, choosing γ to be $(n\varepsilon + \hat{D})/m$ may cause the error for a step input disturbance $d_1$ to again reduce to zero, although stability and transient response may depend on modeling errors and the choice of the filter. In addition, the steady-state error for a step output disturbance $d_2$ may be zero.

Focusing on the selection of filter in accordance with equation 35, the control system 20 may be implemented to minimize or avoid steady state errors for input disturbances $d_1$. It is contemplated that such a filter may be applied to various types of parametric model based control, including when an integrating model is used. This filtering approach may have less relevancy to applications that involve model based control using a non-linear optimization approach or in non-parametric types of model predictive control using a step response or an impulse response.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A control system for controlling a process using a parametric model-based control technique, comprising:
   an input through which a set point for the process is input;
   an output through which a control output is output to the process for controlling the process; and
   a controller in which a behavior of the process is represented with a model, the model based on at least one time-varying parameter, and the controller configured to:
   establish a model output array that contains output values of the model for a series of time samples that includes a time sample corresponding to an estimated dead time of the process;
   revise at least a portion of the model output array that corresponds to time samples occurring after the dead time of the process, the revision based on a change in the time-varying parameter;

establish a disturbance array that contains disturbance values for the process for the series of time samples;

revise at least a portion of the disturbance array that corresponds to the revised portion of the model output array so that, for each revised time sample, a predicted process value determined after the change in time-varying parameter is the same as a predicted process value determined before the change; and generate a bumpless transfer as the control output for the set point based on the revised model output array and the revised disturbance array in response to the change in time-varying parameter.

2. The control system of claim 1, wherein the process is a second or higher order system and is represented by y(t) that equals $a_1*y(t-1)+a_2*y(t-2)+ \ldots +b_0*u(t-q)+b_1*u(t-q-1) + \ldots$, where a is a coefficient corresponding to an autoregressive portion of a polynomial, b is a coefficient corresponding to a moving average portion of the polynomial, u(t) is an array of controller output values and q is a time sample index corresponding to the dead time.

3. The control system of claim 1, wherein the model output values are represented by y(t) that equals $a_1 y(t-1)+b_0*u(t-q)$, where $a_1$ is a coefficient corresponding to an autoregressive portion of a polynomial, $b_0$ is a coefficient corresponding to a moving average portion of the polynomial, u(t) is an array of controller output values and q is a time sample index corresponding to the dead time.

4. The control system of claim 1, wherein the changed time-varying variable is at least one of an estimated lag time or an estimated gain, and the controller revises the model output array by replacing the at least one of the estimated lag time or the estimated gain with a respective changed value.

5. The control system of claim 1, wherein the controller is configured to revise the model output array and the disturbance array for the entirety of each array.

6. The control system of claim 1, wherein the changed time-varying variable is at least one of an estimated lag time of the process or an estimated gain of the process.

7. The control system of claim 1, wherein the controller is further configured to, in response to a change in the estimated dead time, reindex the model output array with the changed estimated dead time.

8. A control system for controlling a process using a parametric model-based control technique, comprising:

an input through which a set point for the process is input;

an output through which a control output is output to the process for controlling the process; and a controller in which a behavior of the process is represented with a model, the model based on at least one time-varying parameter, and the controller configured to:

establish a model output array that contains output values of the model for a series of time samples that includes a time sample corresponding to an estimated dead time of the process;

revise at least a portion of the model output array that corresponds to time samples occurring after the dead time of the process, the revision based on a change in the time-varying parameter; and generate a bumped transfer as the control output for the set point based on the revised model output array and a disturbance of the process in response to the change in time-varying parameter.

9. The control system of claim 8, wherein:

the controller revises the model output array for the entirety of the model output array;

the controller is further configured to:

establish a disturbance array that contains disturbance values for the process for the series of time samples; and revise a portion of the disturbance array that corresponds to time samples occurring before the dead time of the process so that, for each revised time sample, a predicted process value determined after the change in time-varying parameter is the same as a predicted process value determined before the change; and the disturbance of the process is represented by the revised disturbance array.

10. The control system of claim 8, wherein the process is a second or higher order system and is represented by y(t) that equals $a_1*y(t-1)+a_2*y(t-2)+ \ldots b_0*u(t-q)+b_1*u(t-q-1) + \ldots$, where a is a coefficient corresponding to an autoregressive portion of a polynomial, b is a coefficient corresponding to a moving average portion of the polynomial, u(t) is an array of controller output values and q is a time sample index corresponding to the dead time.

11. The control system of claim 8, wherein the model output values are represented by y(t) that equals $a_1 y(t-1)+b_0*u(t-q)$, where $a_1$ is a coefficient corresponding to an autoregressive portion of a polynomial, $b_0$ is a coefficient corresponding to a moving average portion of the polynomial, u(t) is an array of controller output values and q is a time sample index corresponding to the dead time.

12. The control system of claim 8, wherein the changed time-varying variable is at least one of an estimated lag time or an estimated gain, and the controller revises the model output array by replacing the at least one of the estimated lag time or the estimated gain with a respective changed value.

13. The control system of claim 8, wherein the changed time-varying variable is at least one of an estimated lag time of the process or an estimated gain of the process.

14. The control system of claim 8, wherein the controller is further configured to, in response to a change in the estimated dead time, reindex the model output array with the changed estimated dead time.

15. A control system for controlling a process using a parametric model-based control technique, comprising:

an input through which a set point for the process is input;

an output through which a control output is output to the process for controlling the process; and a controller in which a behavior of the process is represented with a model, the model including an estimate of dead time of the process, and the controller configured to:

establish a model output array that contains output values of the model for a series of time samples that includes a time sample corresponding to the estimated dead time of the process;

in response to a change in the estimated dead time, reindex the model output array with the changed estimated dead time; and generate the control output for the set point based on the reindexed model output array.

* * * * *